(12) United States Patent
Lee et al.

(10) Patent No.: US 10,152,765 B2
(45) Date of Patent: Dec. 11, 2018

(54) TEXTURE PROCESSING METHOD AND UNIT

(71) Applicant: Samsung Electronics Co., Ltd., Suwon-si (KR)

(72) Inventors: Sangheon Lee, Hwaseong-si (KR); Soojung Ryu, Hwaseong-si (KR); Yeongon Cho, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 240 days.

(21) Appl. No.: 14/942,316

(22) Filed: Nov. 16, 2015

(65) Prior Publication Data
US 2016/0140688 A1    May 19, 2016

(30) Foreign Application Priority Data

Nov. 18, 2014 (KR) ........................ 10-2014-0160871

(51) Int. Cl.
*G06T 1/60* (2006.01)
*G06T 15/04* (2011.01)
*G06T 15/80* (2011.01)
*G06T 9/00* (2006.01)

(52) U.S. Cl.
CPC .................. *G06T 1/60* (2013.01); *G06T 9/00* (2013.01); *G06T 15/04* (2013.01); *G06T 15/80* (2013.01);
(Continued)

(58) Field of Classification Search
CPC ......... G06T 9/00; G06T 15/04; G06T 15/005; G06T 11/001; G06T 11/40; G06T 7/40; G09G 5/393; G09G 5/06
See application file for complete search history.

(56) References Cited

U.S. PATENT DOCUMENTS

| | | |
|---|---|---|
| 6,339,428 B1 | 1/2002 | Fowler et al. |
| 6,515,673 B1 | 2/2003 | Hashimoto et al. |

(Continued)

FOREIGN PATENT DOCUMENTS

KR    10-2008-0063064 A    7/2008

OTHER PUBLICATIONS

J. Torborg et al., "Talisman: Commodity Realtime 3D Graphics For the PC." *Proceedings of the 23rd annual conference on Computer graphics and interactive techniques*, ACM, Aug. 1996, pp. 353-363.

(Continued)

*Primary Examiner* — Gregory J Tryder
*Assistant Examiner* — Scott E Sonners
(74) *Attorney, Agent, or Firm* — Harness, Dickey & Pierce, P.L.C.

(57) ABSTRACT

A texture processing method of processing a compressed texel block in which texels constituting a texture are compressed into a predetermined block unit includes obtaining, based on the compressed texel block, a representative value of texels constituting a texel block, a weight for each of the texels constituting the texel block, and an index of the representative value and the weight corresponding to each of the texels constituting the texel block; storing the representative value, the weight, and the index in a texture cache; reading the representative value and the weight from the texture cache according to an index corresponding to a requested texel; generating texels based on the read representative value and the read weight; and performing texture filtering using the generated texels.

20 Claims, 15 Drawing Sheets

(52) U.S. Cl.
CPC ............... *G06T 2200/04* (2013.01); *G06T 2207/20021* (2013.01)

(56) References Cited

U.S. PATENT DOCUMENTS

| | | | |
|---|---|---|---|
| 6,937,250 B1* | 8/2005 | Schilling | G06T 15/04 345/582 |
| 6,959,110 B1 | 10/2005 | Danskin et al. | |
| 8,094,164 B1 | 1/2012 | Toksvig et al. | |
| 2008/0187218 A1* | 8/2008 | Strom | G06T 9/001 382/166 |
| 2009/0160857 A1 | 6/2009 | Rasmusson et al. | |
| 2010/0328425 A1 | 12/2010 | Nagaraj et al. | |
| 2012/0281005 A1* | 11/2012 | Nystad | H04N 19/90 345/582 |
| 2012/0320067 A1 | 12/2012 | Iourcha et al. | |
| 2013/0033513 A1 | 2/2013 | Rasmusson et al. | |

OTHER PUBLICATIONS

A. Kugler, "High-Performance Texture Decompression Hardware." *The Visual Computer*, Jan. 1997, vol. 13, No. 2, pp. 51-63.
T. Akenine-Möller et al. "6.2.5 Texture Caching, 6.2.6 Texture Compression", *Real-time Rendering*, CRC Press, 2008. pp. 172-178.
M. Doggett, "Texture caches." *IEEE Micro*, May 2012, vol. 32, No. 3, pp. 136-141.
Extended European Search Report dated May 4, 2016 in counterpart European Application No. 15194810.6 (9 pages in English).

\* cited by examiner

TEXTURE PROCESSING METHOD AND UNIT

CROSS-REFERENCE TO RELATED APPLICATION(S)

This application claims the benefit of Korean Patent Application No. 10-2014-0160871 filed on Nov. 18, 2014, in the Korean Intellectual Property Office, the entire disclosure of which is incorporated herein by reference for all purposes.

BACKGROUND

1. Field

This application relates to texture processing methods and units of processing a compressed texel block in which texels constituting a texture are compressed into a predetermined block unit.

2. Description of Related Art

When rendering is performed on each frame of three-dimensional (3D) graphics, many computations are performed, thereby requiring high power and many hardware resources. Accordingly, it is desirable to reduce the number of computations when performing 3D graphics rendering.

To reduce the number of computations and increase a rendering speed during pixel shading in 3D graphics rendering, a graphics processing unit (GPU) includes a texture processing unit.

The texture processing unit generates a texture needed for texturing. Texturing by applying a previously prepared image to an object formed in a 3D space is one process in 3D graphics rendering for reducing the number of computations. The previously prepared image is referred to as a texture, and the texture may be previously prepared in a compressed form in a memory outside the texture processing unit.

The texture processing unit transmits a texture requested by a shader core after receiving a compressed texel block in which texels constituting the texture are compressed into a predetermined block unit from the memory and processing the compressed texel block.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a texture processing method of processing a compressed texel block in which texels constituting a texture are compressed into a predetermined block unit includes obtaining, based on the compressed texel block, a representative value of texels constituting a texel block, a weight for each of the texels constituting the texel block, and an index of the representative value and the weight corresponding to each of the texels constituting the texel block; storing the representative value, the weight, and the index in a texture cache; reading the representative value and the weight from the texture cache according to an index corresponding to a requested texel; generating texels based on the read representative value and the read weight; and performing texture filtering using the generated texels.

The obtaining may include parsing the representative value of the texels constituting the texel block and the weight for each of the texels constituting the texel block; and generating the index corresponding to each of the texels so that the index corresponding to each of the texels includes a storage location indicating where the representative value is stored in the texture cache, and a storage location indicating where a respective one of the weights is stored in the texture cache.

The storing may include storing the representative value of the texels constituting the texel block in a representative value cache; storing the weight for each of the texels constituting the texel block in a weight cache; and storing the index corresponding to each of the texels constituting the texel block in an index cache.

The reading may include reading the index corresponding to the requested texel from the index cache; and respectively reading the representative value and the weight from the representative value cache and the weight cache according to the read index.

The texture processing method may further include receiving a compressed texel block including the requested texel from a memory outside a texture processing unit configured to perform the texture processing method in response to the index corresponding to the requested texel not being stored in the texture cache.

The texture processing method may further include receiving a compressed texel block including the requested texel from a second texture cache configured to receive and store the compressed texel block including the requested texel from a memory outside a texture processing unit configured to perform the texture processing method in response to the index corresponding to the requested texel not being stored in the texture cache.

The generating of the texels may include generating only some texels of the compressed texel block by performing interpolation using the read representative value and the read weight.

The reading may include determining whether the requested texel is used for pixel shading; and reading the representative value and the weight from the texture cache according to the index corresponding to the requested texel in response to a result of the determining being that the requested pixel is used for pixel shading.

The texture processing method may further include returning a predetermined value in response to the request in response to a result of the determining being that the requested pixel is not used for pixel shading.

In another general aspect, a non-transitory computer-readable storage medium stores instructions for causing computing hardware to perform the texture processing method described above.

In another general aspect, a texture processing unit for processing a compressed texel block in which texels constituting a texture are compressed into a predetermined block unit includes a decompressor configured to obtain, based on the compressed texel block, a representative value of texels constituting a texel block, a weight for each of the texels constituting the texel block, and an index of the representative value and the weight corresponding to each of the texels constituting the texel block; a texture cache configured to store the representative value, the weight, and the index; a controller configured to read the representative value and the weight from the texture cache according to an index corresponding to a requested texel; a texel generator configured to generate texels based on the read representative value and the read weight; and a texture filter configured to perform texture filtering using the generated texels.

The decompressor may include a representative value parser configured to parse the representative value of the texels constituting the texel block; a weight parser configured to parse the weight for each of the texels constituting the texel block; and an index generator configured to generate the index corresponding to each of the texels so that the index corresponding to each of the texels includes a storage location indicating where the representative value is stored in the texture cache, and a storage location indicating where a respective one of the weights is stored in the texture cache.

The texture cache may include a representative value cache configured to store the representative value of the texels constituting the texel block; a weight cache configured to store the weight for each of the texels constituting the texel block; and an index cache configured to store the index corresponding to each of the texels constituting the texel block.

The controller may be further configured to read the index corresponding to the requested texel from the index cache, and respectively read the representative value and the weight from the representative value cache and the weight cache according to the read index.

The decompressor may be further configured to receive a compressed texel block including the requested texel from a memory outside the texture processing unit in response to the index corresponding to the requested texel not being stored in the texture cache.

The texture processing unit may further include a second texture cache configured to receive and store the compressed texel block including the requested texel from a memory outside the texture processing unit; and the decompressor may be further configured to receive a compressed texel block including the requested texel from the second texture cache in response to the index corresponding to the requested texel not being stored in the texture cache.

The texel generator may be further configured to generate only some texels of the compressed texel block by performing interpolation using the read representative value and the read weight.

The controller may be further configured to determine whether the requested texel is used for pixel shading; and read the representative value and the weight from the texture cache according to the index corresponding to the requested texel in response to a result of the determining being that the requested texel is used for pixel shading.

The controller may be further configured to return a predetermined value in response to the request in response to a result of the determining being that the requested texel is not used for pixel shading.

The representative value may be a value corresponding to an endpoint value of the texels constituting the texel block arranged in a predetermined order.

In another general aspect, a texture processing unit for processing a compressed texel block in which texels constituting a texture are compressed into a predetermined block unit using compression parameters includes a decompressor configured to extract, from the compressed texel block, the compression parameters that were used to compress the texels into the predetermined block unit; and a texel generator configured to generate only a texel requested from the texture processing unit based on the extracted compression parameters, and not generate any texel not requested from the texture processing unit based on the extracted compression parameters;

The compression parameters may include a representative value of texels constituting a texel block, a weight for each of the texels constituting the texel block, and an index of the representative value and the weight corresponding to each of the texels constituting the texel block.

The representative value may include a highest value of the texels constituting the texel block, and a lowest value of the texels constituting the texel block.

The texture processing unit may further include a texture cache configured to store the extracted compression parameters; and a controller configured to read compression parameters corresponding to the requested texel from the texture cache; and the texel generator may be further configured to generate the requested texel based on the read compression parameters.

The decompressor may be further configured to receive a compressed texel block including the requested texel from a memory outside the texture processing unit in response to the parameters corresponding to the requested texel not being stored in the texture cache.

The texture processing unit may further include a second texture cache configured to receive compressed texel blocks from a memory outside the texture processing unit, and store the received compressed texel blocks; and the decompressor may be further configured to receive a compressed texel block including the requested texel from the second texture cache in response to the compression parameters corresponding to the requested texel not being stored in the texture cache, and receive the compressed texel block including the requested texel from the memory outside the texture processing unit in response to the compression parameters corresponding to the requested texel not being stored in the texture cache and the compressed texel block including the requested texel not being stored in the second texture cache.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terms "configured" or "included" used herein should not be construed to include all of various elements or operations described in the specification, but should be construed to not include some of the various elements or operations or to further include additional elements or operations.

Although the terms "first," second," etc., may be used herein to describe various elements, these elements are not to be limited by these terms. These elements are only used to distinguish one element from another.

In this application, a statement that a first element requests information from a second element means that the first element sends a request for the information to the second element.

Figure 1:
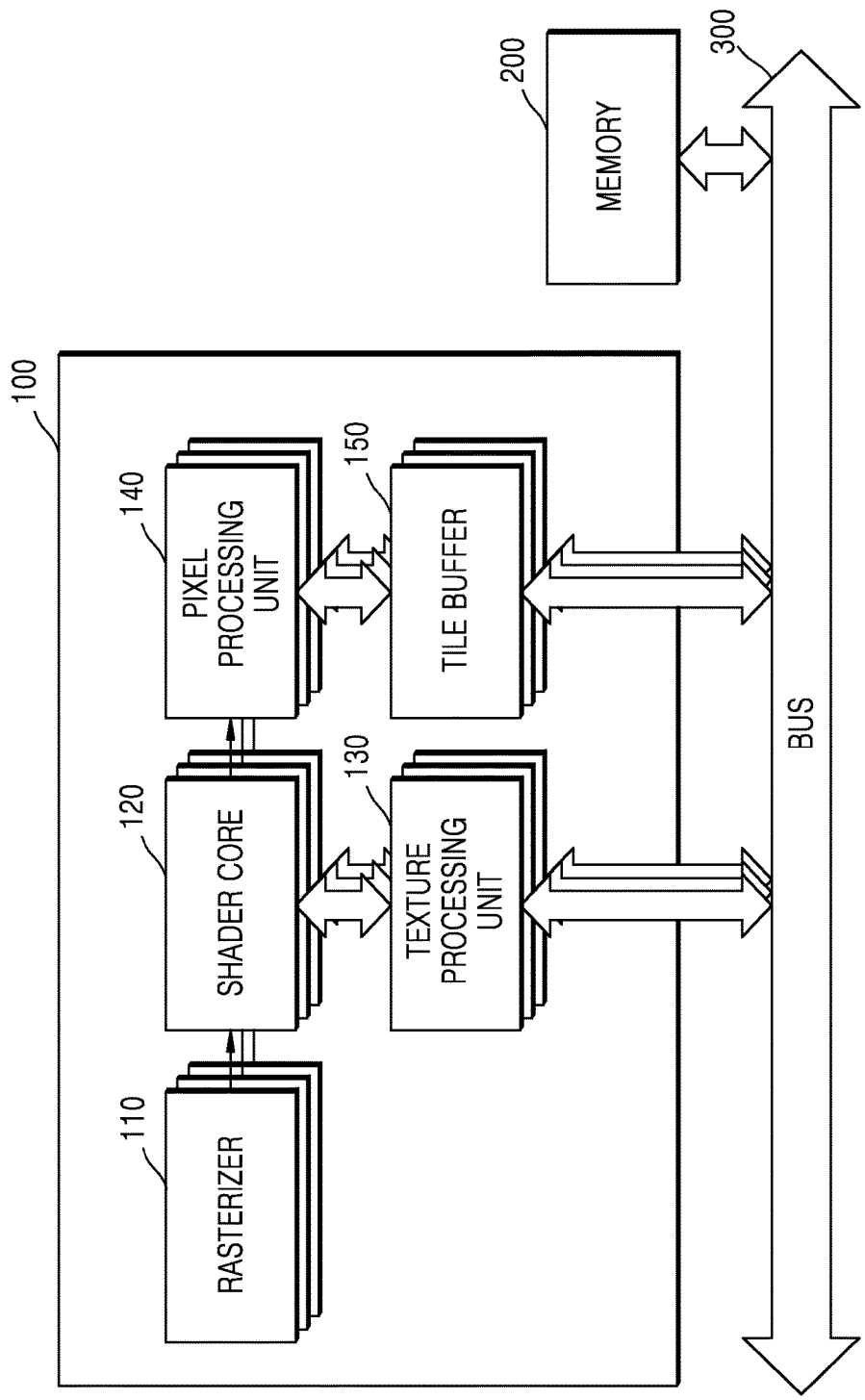
FIG. 1 is a block diagram illustrating an example of a graphics processing unit (GPU).

FIG. 1 is a block diagram illustrating an example of a graphics processing unit (GPU) 100. It will be apparent to one of ordinary skill in the art that the GPU 100 may further include general-purpose elements other than the elements shown in FIG. 1.

Referring to FIG. 1, the GPU 100 includes a rasterizer 110, a shader core 120, a texture processing unit 130, a pixel processing unit 140, and a tile buffer 150. The GPU 100 transmits data to and receives data from a memory 200 outside the GPU 100 via a bus 300.

In the example in FIG. 1, the GPU 100 for processing three-dimensional (3D) graphics performs tile-based rendering (TBR). In other words, to generate 3D graphics corresponding to one frame, the GPU 100 processes a plurality of tiles having a predetermined size into which the frame is divided using the rasterizer 110, the shader core 120, and the pixel processing unit 140, and stores a processing result in the tile buffer 150. The GPU 100 may simultaneously process all of the tiles constituting a frame using a plurality of channels, each of which includes the rasterizer 110, the shader core 120, and the pixel processing unit 140. Once a plurality of tiles corresponding to one frame have been processed, the GPU 100 transmits a processing result stored in the tile buffer 150 to a frame buffer (not shown) of the memory 200.

The shader core 120 includes a pixel shader. The shader core 120 may further include a vertex shader, or may include a unified shader in which a vertex shader and a pixel shader are combined with each other. When the shader core 120 functions as a vertex shader, the shader core 120 generates a primitive representing an object and transmits the primitive to the rasterizer 110.

The rasterizer 110 rasterizes the primitive generated by the vertex shader through geometric transformation.

The shader core 120 receives the primitive rasterized by the rasterizer 110 and performs pixel shading. The shader core 120 performs the pixel shading to determine the colors of all of the pixels constituting tiles including fragments of the rasterized primitive. The shader core 120 uses a pixel value generated using a texture to generate stereoscopic and realistic 3D graphics during the pixel shading.

When the shader core 120 requests the texture processing unit 130 to send a pixel value corresponding to a desired pixel, the texture processing unit 130 transmits a pixel value generated by processing a texture that is previously prepared. The texture is stored in a predetermined space inside or outside the texture processing unit 130, or in the memory 200 outside the GPU 100. When the texture to be used to generate the pixel value requested by the shader core 120 is not stored in the predetermined space inside the texture processing unit 130, the texture processing unit 130 retrieves and uses the texture from the predetermined space outside the texture processing unit 130 or from the memory 200.

The pixel processing unit 140 determines a pixel value to be finally displayed by performing a process such as a depth test on pixels corresponding to the same location in one tile and determines all pixel values corresponding to the one tile.

The tile buffer 150 stores all of the pixel values corresponding to the one tile transmitted from the pixel processing unit 140. When graphics processing on all of the tiles constituting one frame is completed, a processing result stored in the tile buffer 150 is transmitted to the frame buffer of the memory 200.

Figure 2:
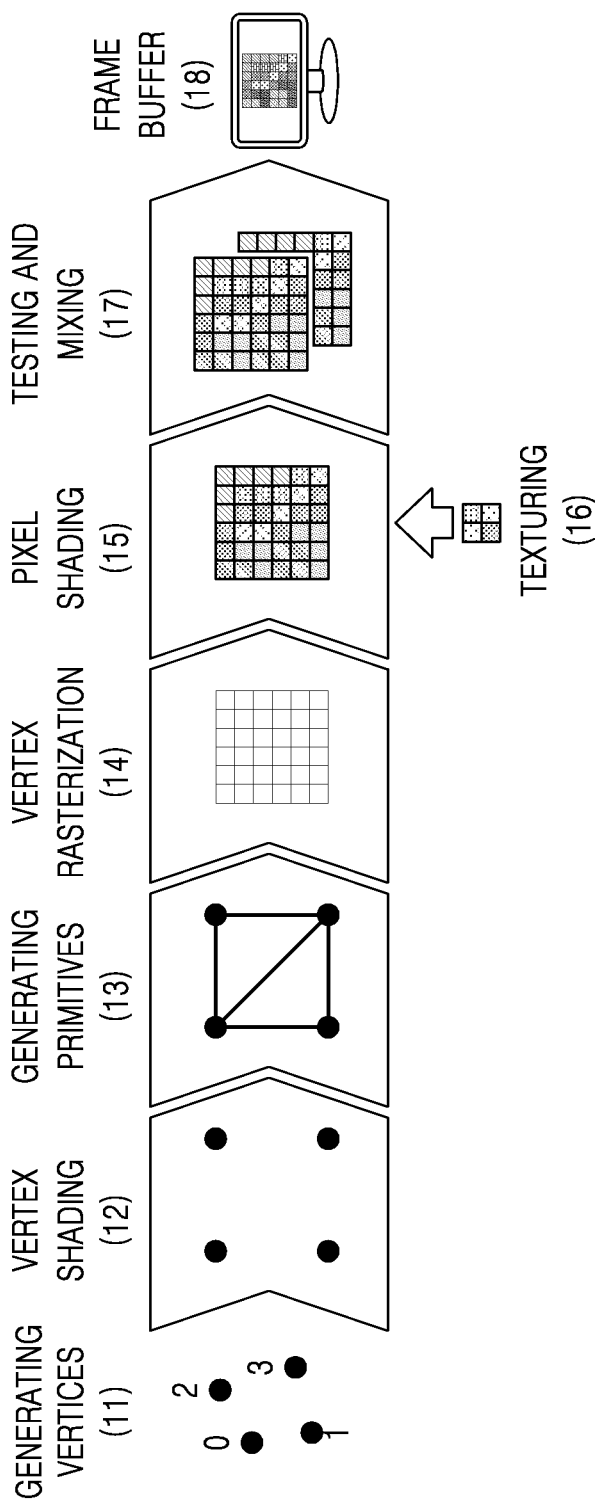
FIG. 2 is a diagram for explaining an example of a process performed by the GPU to perform three-dimensional (3D) graphics processing.

FIG. 2 is a diagram for explaining an example of a process performed by the GPU 100 to perform 3D graphics processing.

A process of processing 3D graphics may be roughly divided into three processes, that is, geometric transformation, rasterization, and pixel shading, which will now be explained in detail with reference to FIG. 2. Referring to FIG. 2, a process of processing 3D graphics includes operations 11 through 18.

Operation 11 is an operation in which vertices are generated. The vertices are generated to represent objects included in 3D graphics.

Operation 12 is an operation in which the generated vertices are shaded. A vertex shader performs shading on the vertices by designating locations of the vertices generated in operation 11.

Operation 13 is an operation in which primitives are generated. The term 'primitive' refers to a point, a line, or a polygon formed using at least one vertex. For example, a primitive may be a triangle formed by connecting three vertices.

Operation 14 is an operation in which the primitives are rasterized. When a primitive is rasterized, it means that the primitive is divided into fragments. A 'fragment' is a basic unit for performing graphics processing on a primitive. Since a primitive includes only information about vertices, graphics processing may be performed on 3D graphics by generating fragments between vertices during rasterization.

Operation 15 is an operation which pixels are shaded. Fragments that constitute the primitives and are generated during rasterization are pixels that constitute tiles. The terms 'fragment' and 'pixel' are interchangeably used in the art. For example, a pixel shader may be referred to as a fragment shader. In general, a basic unit of graphics processing that constitutes a primitive may be referred to as a fragment, and a basic unit of the graphics processing after pixel shading may be referred to as a pixel. Colors of the pixels are determined during pixel shading.

Operation 16 is an operation in which texturing for determining colors of the pixels is performed. The term 'texturing' refers to a process of determining of a color of a pixel using an image that is previously prepared, that is, a texture. When a color of each pixel is calculated and determined, to express various colors and patterns in the real world, the number of data computations needed for graphics processing and a graphics processing time may be greatly increased. Accordingly, a color of a pixel is determined using a texture that is previously prepared. For example, a color of a pixel is determined by storing a surface color of an object as a separate two-dimensional (2D) image that is a texture, and enlarging and reducing the stored texture according to a location and a size of the object on a screen, or combining texel values using textures having various resolutions.

In greater detail, for faster 3D graphics processing during pixel shading, pixel values generated using textures that are previously prepared may be used. The pixel values are generated by previously preparing a plurality of textures and combining the textures to adaptively correspond to a size of an object. The textures that have different resolutions and are previously prepared are referred to as mipmaps. For example, pixel values of an object having a medium resolution between two mipmaps that are previously prepared may be generated by extracting and filtering texel values at a location corresponding to the object from the two mipmaps.

Operation 17 is an operation in which testing and mixing are performed. Pixel values of one tile are determined by performing a process such as a depth test on pixels corresponding to the same location in the tile, and determining a pixel value to be finally displayed. 3D graphics corresponding to one frame are generated by mixing a plurality of tiles generated through the above process.

Operation 18 is an operation in which the frame generated in operations 11 through 17 is stored in a frame buffer and displayed on a display device.

It is physically impossible to store all textures of various objects and mipmaps corresponding to the textures in a predetermined space in the texture processing unit 130. To minimize a space needed to store textures and to efficiently transmit the textures, in general, the textures are compressed and then stored or transmitted in 3D graphics rendering.

However, to decompress the compressed textures, many computations, a lot of time, and high power consumption are needed. Furthermore, when additional compressed textures are needed during texturing using texture mipmaps, more computations, time, and power consumption are needed to decompress the additional compressed textures. Accordingly, the texture processing unit 130 needs a method of more efficiently decompressing compressed textures.

The texture processing unit 130 and a texture processing method that efficiently perform graphics processing to decompress a compressed texel block in which texels constituting a texture are compressed into a predetermined block unit by dividing a decompression process and completing the decompression process only for some texels, instead of the entire compressed texel block, will now be explained.

Figure 3:
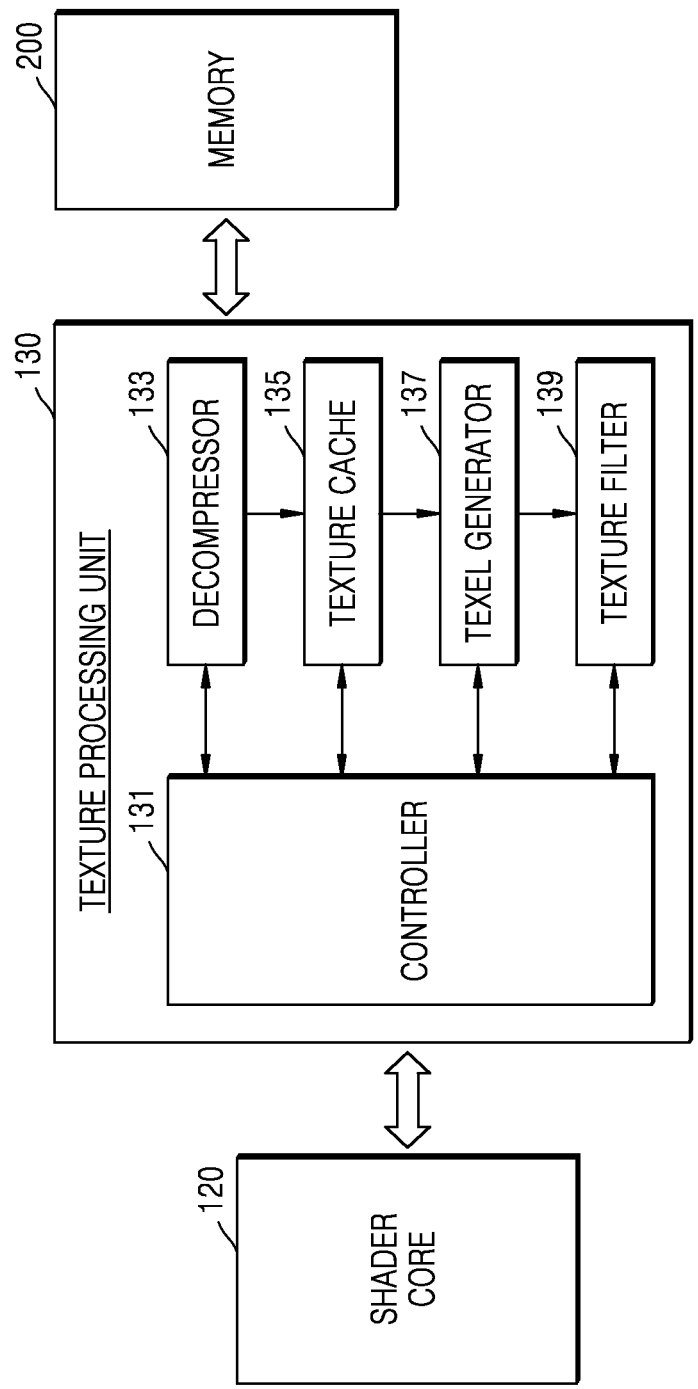
FIG. 3 is a block diagram illustrating an example of a configuration of a texture processing unit.

FIG. 3 is a block diagram illustrating an example of a configuration of the texture processing unit 130.

Referring to FIG. 3, the texture processing unit 130 includes a controller 131, a decompressor 133, a texture cache 135, a texel generator 137, and a texture filter 139.

The controller 131 performs computations needed to control the texture processing unit 130, or generally controls the texture processing unit 130 by controlling the decompressor 133, the texture cache 135, the texel generator 137, and the texture filter 139.

When the texture processing unit 130 receives a compressed texture from the memory 200 outside the texture processing unit 130, the decompressor 133 decompresses the compressed texture. According to general texture compression standards, since a texture may be compressed into at least one compressed texel block in which texels constituting a texture are compressed into a predetermined block unit, the decompressor 133 receives the compressed texel block.

The term 'compressed texel block' refers to a texel block in which texels constituting a texture are compressed into a predetermined block unit. In contrast, the term 'texel block' refers to texels of a predetermined block unit to be obtained through compression from texels constituting a texture before being compressed or texels generated after completely decompressing a compressed texel block. One texture includes at least one texel block. One compressed texture includes at least one compressed texel block. In other words, a texture is compressed into at least one compressed texel block.

Figure 4:
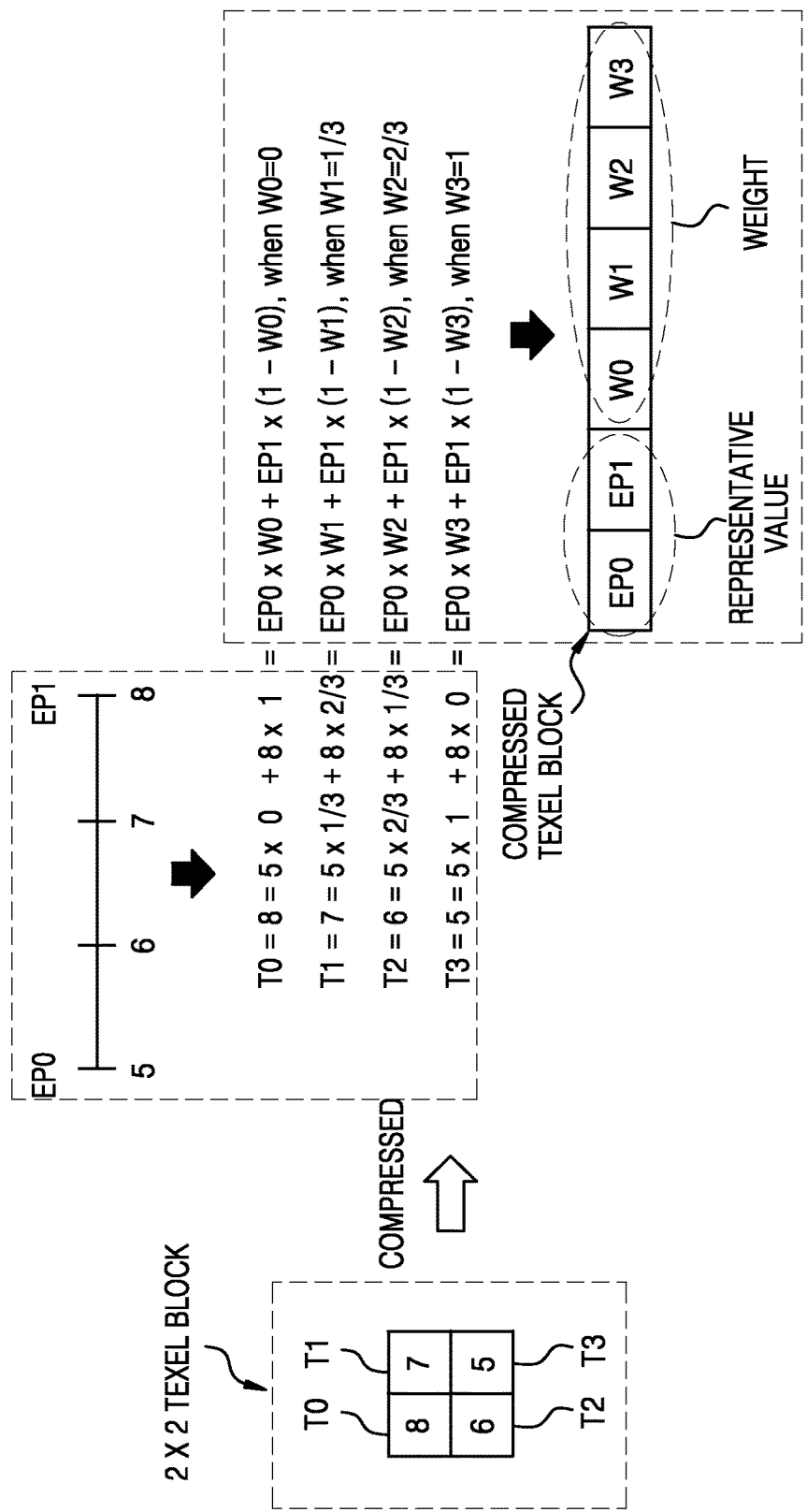
FIG. 4 is a diagram for explaining an example of a compressed texel block.

FIG. 4 is a diagram for explaining an example of a compressed texel block.

To satisfy requirements of hardware resources and communication environments, a texture is generally stored as a compressed form during 3D graphics processing. A general compression method is performed on texels of a predetermined block unit, that is, a texel block, among texels constituting a texture. A process of generating a compressed texel block in which texels constituting a texture are compressed into a predetermined block unit will now be explained with reference to FIG. 4.

According to general texture compression standards, a representative value of a texel block to be compressed is determined, a weight to be applied to the representative value to obtain each texel value is obtained, and the representative value and the weight are stored.

Referring to FIG. 4, a process of generating a compressed texel block by compressing a texel block of 2×2 is illustrated. As shown in FIG. 4, the texel block of 2×2 includes 4 texels, that is, T0, T1, T2, and T3, and it is assumed for convenience of explanation that texel values of the texels T0, T1, T2, and T3 are respectively 8, 7, 6, and 5.

The 4 texel values are arranged in an ascending or descending order, and a highest value and a lowest value corresponding to endpoint values of the 4 texel values arranged in the ascending or descending order are determined to be representative values of the 4 texel values. Next, a weight to be applied to each of the two endpoint values is calculated to represent the texel values.

For example, for the texel T0, since the texel value is 8 and is equal to an endpoint value EP1 corresponding to a highest value among the texel values, a weight W0 of the texel T0 is calculated by determining a weight to be applied to an endpoint value EP0 corresponding to a lowest value among the texel values to be 0. In such a manner, weights W1 through W3 of the texels T1 through T3 are respectively calculated to be ⅓, ⅔, and 1. As can be see from FIG. 4, $Tn=(EP0 \times Wn)+(EP1 \times (1-Wn))$, from which it follows that $Wn=(Tn-EP1)/(EP0-EP1)$.

A compressed texel block stores representative values corresponding to endpoint values and weights of the texels. Referring to FIG. 4, a compressed texel block of the texel block of 2×2 stores the endpoint values EP0 and EP1 determined to be the representative values and the weights W0, W1, W2, and W3.

The texel block of 2×2 is obtained by completely decompressing the compressed texel block by reversing the compression method of FIG. 4 by calculating $Tn=(EP0 \times Wn)+(EP1 \times (1-Wn))$ for each of the texels T0 through T3.

Figure 5:
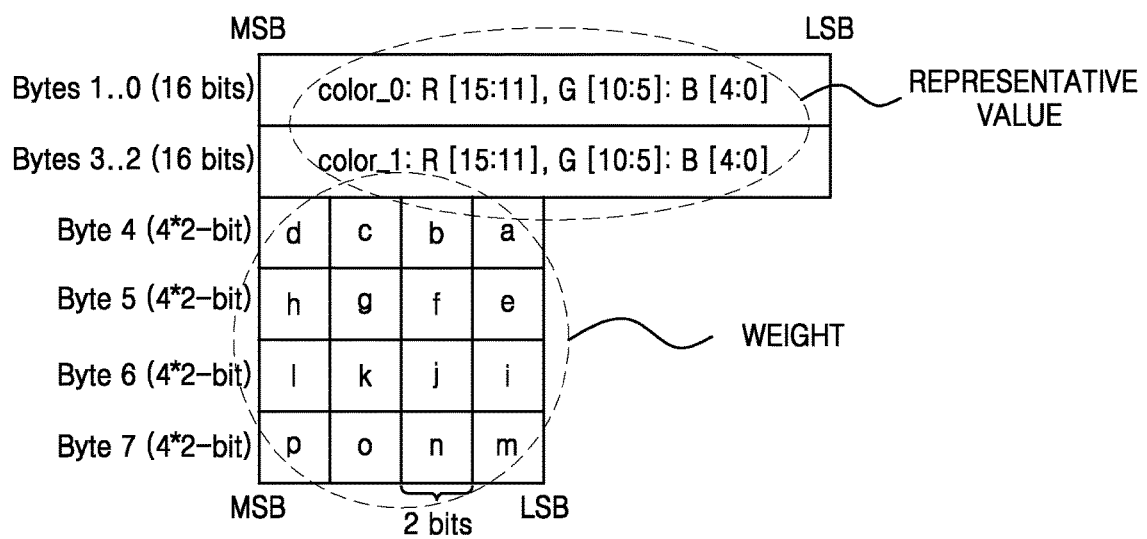
FIG. 5 is a diagram illustrating another example of a compressed texel block.

FIG. 5 is a diagram illustrating another example of a compressed texel block.

In detail, FIG. 5 is a diagram illustrating that a texel block of 4×4 is compressed according to a texture compression standard. Referring to FIG. 5, a compressed texel block of 8 bytes is obtained.

The texel block of 4×4 is compressed into a compressed texel block of 8 bytes by assigning 2 bytes to each of two representative values and assigning 2 bits to each information obtained by encoding weight values of each of 16 texels.

Referring back to FIG. 3, the decompressor 133 performs part of a decompression process without obtaining a texel block that is completely decompressed from a received compressed texel block. In other words, the decompression process is divided into a process of extracting compression parameters used for a compression process from the compressed texel block, and a process of generating texels from the extracted compression parameters, and only the former process of the two processes is performed. This is to minimize unnecessary computations for decompression by delaying part of the decompression process until a texel of the compressed text block is actually requested. In particular, in the latter process of the two processes, when interpolation is performed based on the compression parameters to generate texel values, high power consumption and many hardware resources are needed due to a combination of a plurality of multiplications and additions performed during the interpolation. Accordingly, power consumption and hardware resources may be greatly reduced by performing the latter process only on texels that are actually requested from the texture processing unit 130.

In detail, the decompressor 133 obtains, based on a compressed texel block, a representative value of texels constituting a texel block, a weight for each of the texels constituting the texel block, and an index of the representative value and the weight corresponding to each of the texels constituting the texel block. The representative value may be determined to be an arbitrary value based on values of the texels constituting the texel block. For example, the representative value may be a value corresponding to an endpoint value when the texels constituting the texel block are arranged in a predetermined order. The weight for each of the texels may be a weight value itself, or information obtained by encoding the weight value. The representative value and the weight obtained based on the compressed texel block may vary according to a type of a texture compression standard. In other words, the number of the representative values and a method of determining the representative values may vary according to the type of the compression standard, and thus the weight may accordingly vary. Thus, the term "representative value" as used in this application includes a case in which there is only one representative value, and a case in which there are two or more representative values.

The decompressor 133 performs a process of extracting compression parameters used for a compression process from the compressed texel block. The decompressor 133 generates the index for each of the texels, indicating which one is to be used among the extracted compression parameters, to generate each of the texels constituting the texel block.

The texture cache 135 stores the representative values, the weight, and the index of the representative value and the weight obtained by the decompressor 133. The texture cache 135 performs a process of storing the compression parameters used for the compression process. Values stored in the texture cache 135 are used to complete a decompression process for generating texels requested from the texture processing unit 130.

The controller 131 reads the representative value and the weight from the texture cache 135 according to an index corresponding to the texels requested from the texture processing unit 130. The controller 131 receives a texel request for a pixel to be processed by the shader core 120 by receiving from the shader core 120 a texel address corresponding to the pixel to be processed by the shader core 120. Since at least one texel included in the texel block is needed to obtain a texel requested from the texture processing unit 130, an index corresponding to the texel requested from the texture processing unit 130 is at least one index.

The texel generator 137 generates texels based on the representative value and the weight read from the texture cache 135. The texel generator 137 may include a plurality of interpolators to simultaneously generate a plurality of texels.

The texture filter 139 performs texture filtering using texel values generated by the texel generator 137. When the texel values are filtered, it means that a color value corresponding to a pixel is obtained by blending the texel values. For example, a color value corresponding to a pixel may be obtained by obtaining an average of texel values included in a part of a texture space including the texel address of the texels requested from the texture processing unit 130. The texel values filtered by the texture filter 139 are transmitted to the shader core 120 in response to a request from the shader core 120. The texture filtering performed by the texture filter 139 may be any of various filtering methods, such as, for example, trilinear filtering.

Figure 6:
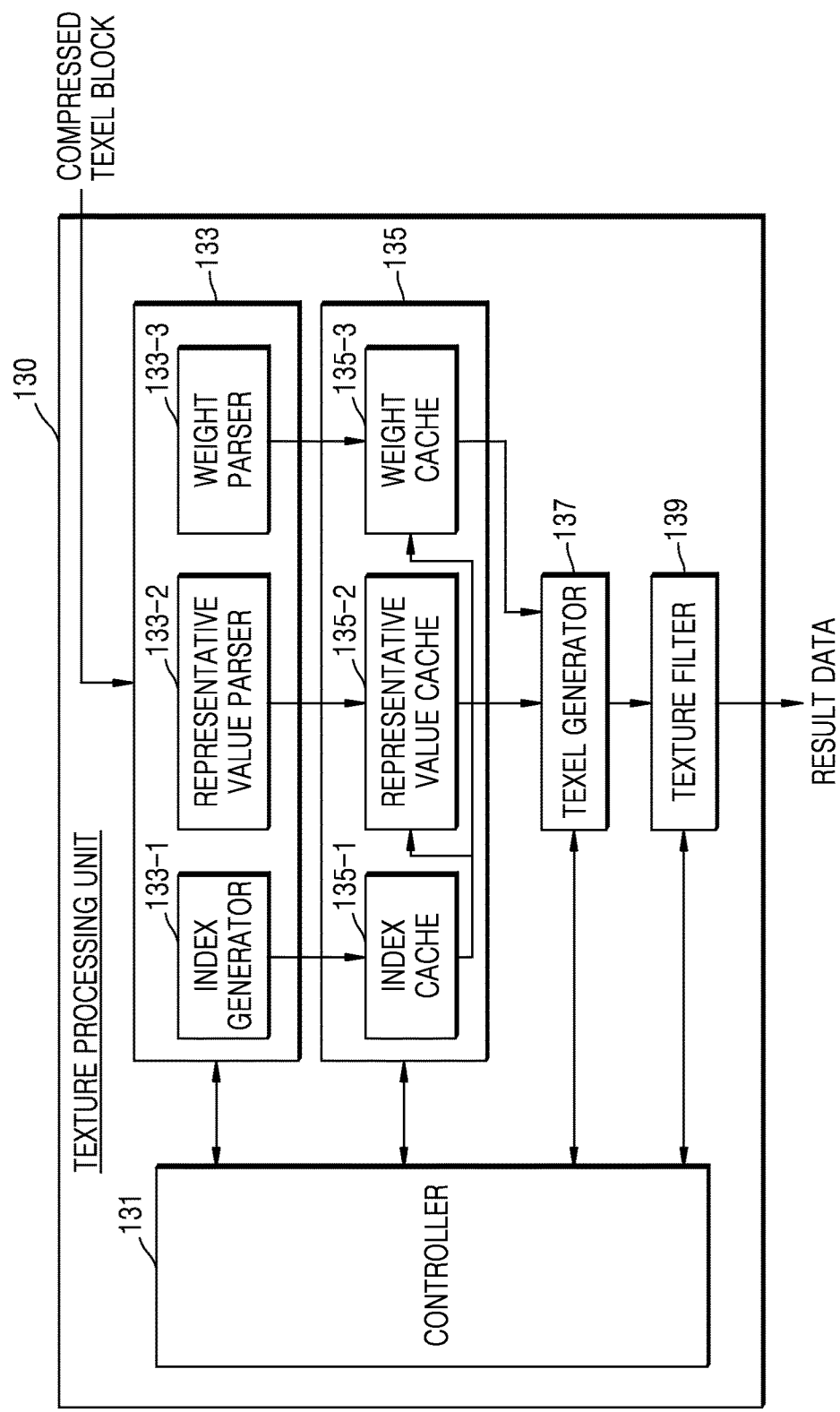
FIG. 6 is a block diagram for explaining an example of an operation of the texture processing unit.

FIG. 6 is a block diagram for explaining an example of an operation of the texture processing unit 130.

Referring to FIG. 6, the texture processing unit 130 includes the controller 131, the decompressor 133, the texture cache 135, the texel generator 137, and the texture filter 139. The decompressor 133 includes an index generator 133-1, a representative value parser 133-2, and a weight parser 133-3. The texture cache 135 includes an index cache 135-1, a representative value cache 135-2, and a weight cache 135-3.

The decompressor 133 obtains, based on a compressed texel block, a representative value of texels constituting a texel block, a weight for each of the texels constituting the texel block, and an index of the representative value and the weight corresponding to each of the texels constituting the texel block. That is, when the decompressor 133 receives the compressed texel block in which texels constituting a texture are compressed into a predetermined block unit using the representative value and the weight, the decompressor 133 obtains the representative value, the weight, and the index of the representative value and the weight based on the received compressed block. The representative value parser 133-2, the weight parser 133-3, and the index generator 133-1 of the decompressor 133 will now be explained in detail.

The representative value parser 133-2 parses the representative value of the texels constituting the texel block. The representative value of the texels constituting the texel block may be an endpoint value of the texels, and the number of the representative values may be two or more.

The weight parser 133-3 parses the weight for each of the texels constituting the texel block. The number of the weights is equal to the number of the texels constituting the texel block.

The representative value parser 133-2 and the weight parser 133-3 obtain the representative value and the weight by identifying an area in which the representative value is stored and an area in which the weight is stored in the compressed texel block received by the decompressor 133.

The index generator 133-1 generates the index corresponding to each of the texels, including a storage location of the representative value of the texels in the texture cache 135 and a storage location of the weight corresponding to each of the texels in the texture cache 135. In other words, the index corresponding to each of the texels includes a storage location of the representative value of the texels in the representative value cache 135-2 and a storage location of the weights corresponding to each of the texels in the weight cache 135-3.

The texture cache 135 stores the representative value, the weight, and the index of the representative value and the weight obtained by the decompressor 133. In other words, the texture cache 135 stores the representative value of the texels constituting the entire compressed texel block, the weight for each of the texels constituting the texel block, and the index of the representative value and the weight corresponding to each of the texels constituting the texel block.

The representative value cache 135-2 stores the representative value of the texels constituting the texel block.

The weight cache 135-3 stores the weight for each of the texels constituting the texel block.

The index cache 135-1 stores the index corresponding to each of the texels constituting the texel block. The index is stored in the index cache 135-1 to correspond to a texel address.

The index cache 135-1, the representative value cache 135-2, and the weight cache 135-3 may be caches that are physically separated from one another. Also, the index cache 135-1, the representative value cache 135-2, and the weight cache 135-3 may be separated areas obtained by dividing one texture cache 135 into predetermined spaces. In other words, when a storage space of the texture cache 135 is divided into three spaces, the three spaces may be respectively used as the index cache 135-1, the representative value cache 135-2, and the weight cache 135-3.

Figure 7:
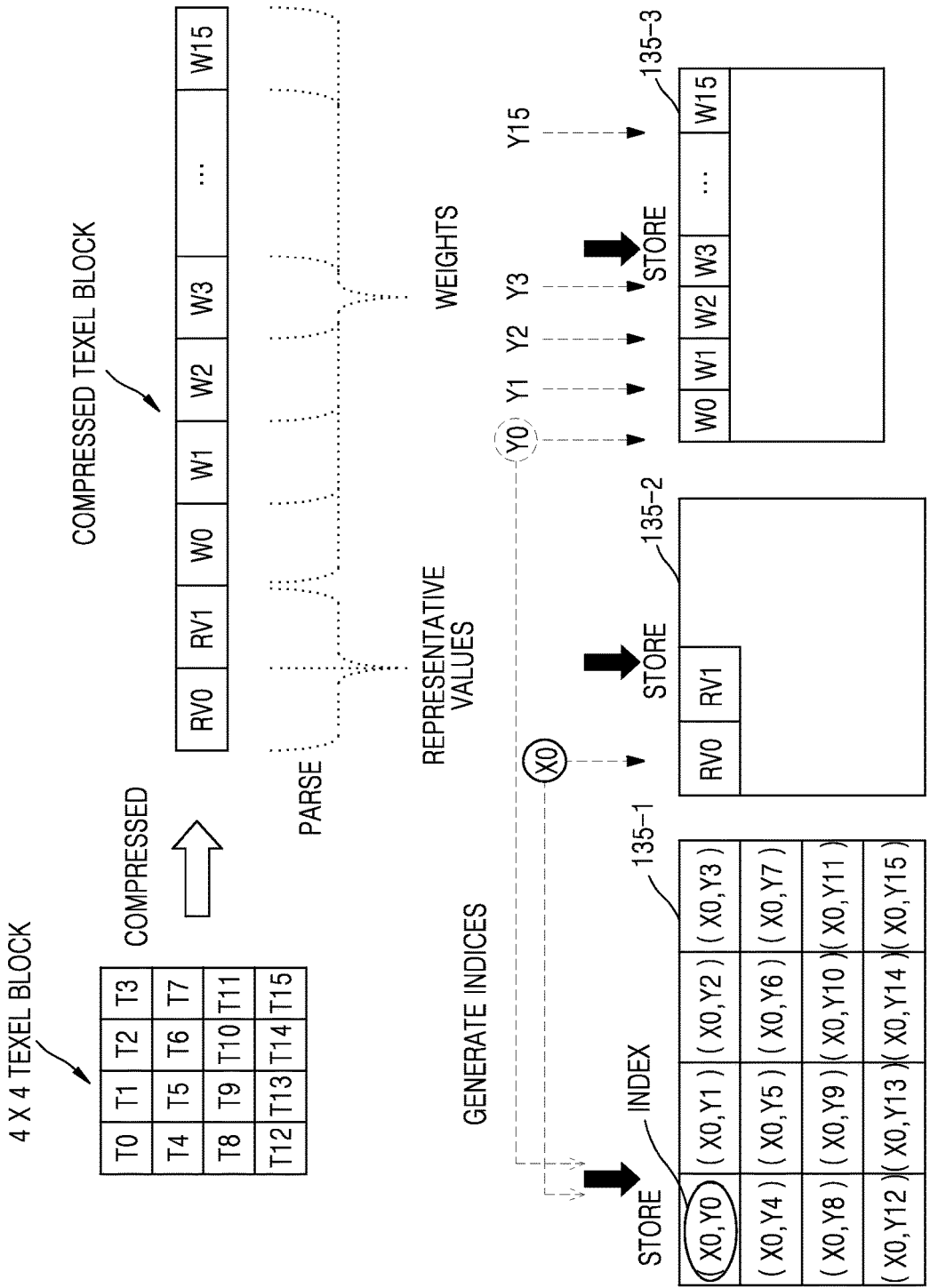
FIG. 7 is a diagram for explaining an example of an operation of obtaining a representative value, a weight, and an index based on a compressed texel block and storing the obtained representative value, weight, and index in a texture cache.

FIG. 7 is a diagram for explaining an example of an operation of obtaining a representative value, a weight and an index based on a compressed texel block and storing the representative value, the weight, and the index in the texture cache 135.

For convenience of explanation, the following will be explained on the assumption that a texel block of 4×4 is a compressed texel block. The texel block of 4×4 includes 16 texels from a texel T0 to a texel T15.

In FIG. 7, the compressed texel block includes two representative values RV0 and RV1 and weights W0 through W15 of the 16 texels. When the compressed texel block is received by the decompressor 133, a representative value, a weight, and an index are obtained based on the received compressed texel block and are stored in the texture cache 135.

In detail, the representative value parser 133-2 and the weight parser 133-3 of the decompressor 133 parse the representative values RV0 and RV1 and the weights W0 through W15 included in the compressed texel block. The representative value parser 133-2 parses the representative values RV0 and RV1 and processes the representative values RV0 and RV1 as a representative value of the texels constituting the texel block. The weight parser 133-3 parses the weights W0 through W15 and processes the weights W0 through W15 as a weight for each of the texels constituting the texel block.

The index generator 133-1 generates an index corresponding to each of the texels, each index including a storage location of the representative value of the texels in the texture cache 135 and a storage location of the weight corresponding to each of the texels in the texture cache 135. In other words, the index generator 133-1 generates the index corresponding to each of the texels, and the index includes a storage location of the representative value of the texels parsed by the representative value parser 133-2 in the representative value cache 135-2 and a storage location of the weight corresponding to each of the texels parsed by the weight parser 133-3 in the weight cache 135-3.

Referring to FIG. 7, the index generator 133-1 generates the index of each of the texels, including a storage location X0 of the representative values RV0 and RV1 of the texels in the representative value cache 135-2 and any one of storage locations Y0 through Y15 of the weights corresponding to each of the texels in the weight cache 135-3.

For example, an index corresponding to the texel T0 constituting the texel block is represented as an index (X0, Y0) including the storage location X0 of the representative values RV0 and RV1 in the representative value cache 135-2 and the storage location Y0 of the weight W0 corresponding to the texel T0 in the weight cache 135-3. As another example, an index corresponding to the texel T1 constituting the texel block is represented as an index (X0, Y1) including the storage location X0 of the representative values RV0 and RV1 in the representative value cache 135-2 and the storage location Y1 of the weight W1 corresponding to the texel T1 in the weight cache 135-3. In such a manner, the index generator 133-1 generates indices (X0, Y0) through (X0, Y15) respectively corresponding to the texels T0 through T15 constituting the texel block.

The representative value of the texels parsed by the representative value parser 133-2 is stored in the representative value cache 135-2, and the weight corresponding to each of the texels parsed by the weight parser 133-3 is stored in the weight cache 135-3. The index corresponding to each of the texels constituting the texel block generated by the index generator 133-1 is stored in the index cache 135-1. The index corresponding to each of the texels is stored after being matched to a texel address of each of the texels. An index corresponding to a texel requested from the texture processing unit 130 is read from the index cache 135-1 by transmitting a texel address of the requested texel to the index cache 135-1. According to the index read from the index cache 135-1, a representative value and a weight corresponding to the texel requested from the texture processing unit 130 are respectively read from the representative value cache 135-2 and the weight cache 135-3.

Referring back to FIG. 6, the controller 131 reads the index corresponding to the requested texel from the index cache 135-1, and respectively reads the representative value and the weight from the representative value cache 135-2 and the weight cache 135-3 according to the read index.

When the index corresponding to the requested texel is not stored in the texture cache 135, the controller 131 requests the memory 200 outside the texture processing unit 130 for a compressed texel block including the requested texel. Accordingly, the decompressor 133 receives the compressed texel block including the requested texel from the memory 200 outside the texture processing unit 130.

The texel generator 137 generates texels based on the representative value and the weight read from the texture cache 135. In detail, the texel generator 137 may generate only some texels of the compressed texel block by performing interpolation using the representative value and the weight read from the texture cache 135. Accordingly, the texel generator 137 may complete a decompression process only for those texels requested from the texture processing unit 130, instead of the entire compressed texel block, thereby preventing power consumption due to unnecessary decompression and reducing the demand for hardware resources.

The texture filter 139 performs texture filtering using the texels generated by the texel generator 137. The texture filter 139 may perform texture filtering when the number of the texels generated by the texel generator 137 is a minimum number needed to perform the texture filtering.

Figure 8:
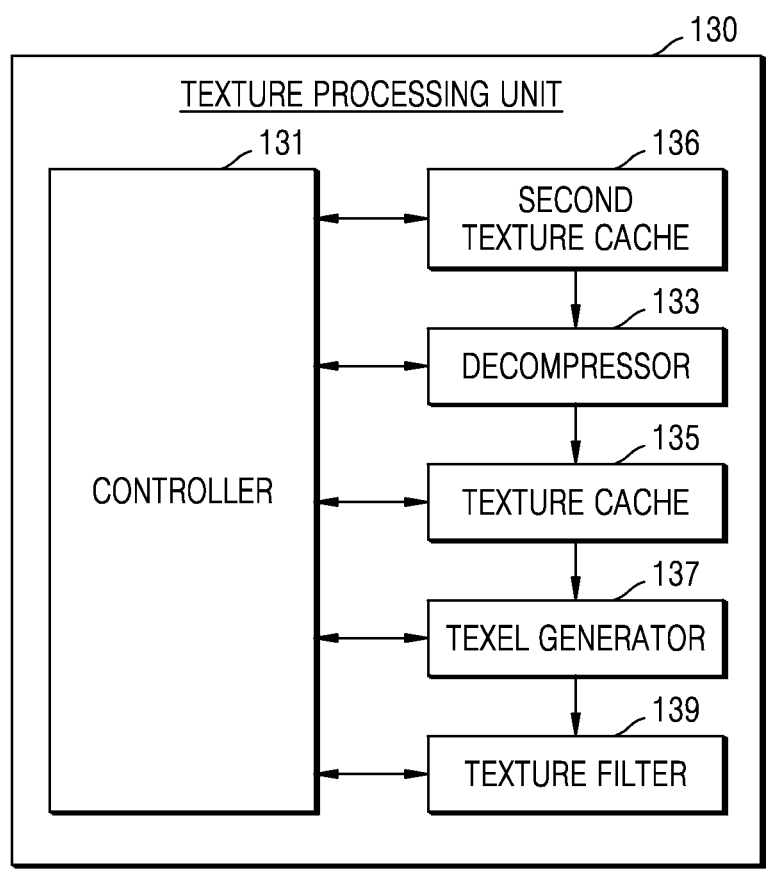
FIG. 8 is a block diagram illustrating another example of a configuration of a texture processing unit.

FIG. 8 is a block diagram illustrating another example of a configuration of the texture processing unit 130.

Referring to FIG. 8, the texture processing unit 130 further includes a second texture cache 136 in addition to the controller 131, the decompressor 133, the texture cache 135, the texel generator 137, and the texture filter 139. In other words, the texture processing unit 130 of FIG. 8 further includes the second texture cache 136 that receives and stores a compressed texel block from the memory 200 outside the texture processing unit 130, as compared to the texture processing unit 130 of FIGS. 3 and 6.

Although an operation of the texture processing unit 130 of FIG. 8 is similar to an operation of the texture processing unit 130 of FIGS. 3 and 6, when an index corresponding to a texel requested from the texture processing unit 130 is not stored in the texture cache 135, a compressed texel block including the index corresponding to the requested texel is requested from the second texture cache 136 inside the texture processing unit 130, instead of from the memory 200 outside the texture processing unit 130.

When the index corresponding to the requested texel is not stored in the texture cache 135, the controller 131 requests the compressed texel block including the requested texel from the second texture cache 136 inside the texture processing unit 130. Accordingly, the decompressor 133 receives the compressed texel block including the requested texel from the second texture cache 136 inside the texture processing unit 130. However, when the compressed texel block including the requested texel is not stored in the second texture cache 136, the controller requests the compressed texel block including the requested texel from the memory 200 outside the texture processing unit 130. The second texture cache 136 stores one or more compressed texel blocks that have been requested from the memory 200 outside the texture processing unit 130 in one or more previous texture processing operations. When a compressed texel block is requested from the memory 200 outside the texture processing unit 130, only the requested compressed texel block that is currently being requested may be retrieved from the memory 200 outside the texture processing unit 130 and stored in the second texture cache 136, or a plurality of successive compressed texel blocks including the compressed texel block that is currently being requested may be retrieved from the memory 200 outside the texture processing unit 130 and stored in the second texture cache 136 with the expectation that a compressed texel block that is next requested from the memory 200 outside the texture processing unit 130 may be in the vicinity of the requested compressed texel block that is currently being requested.

The decompressor 133 may rapidly perform 3D graphics processing by reducing the number of accesses to the memory 200 by receiving the compressed texel block including the requested texel from the second texture cache 136 inside the texture processing unit 130 when possible, instead of from the memory 200 outside the texture processing unit 130.

Figure 9:
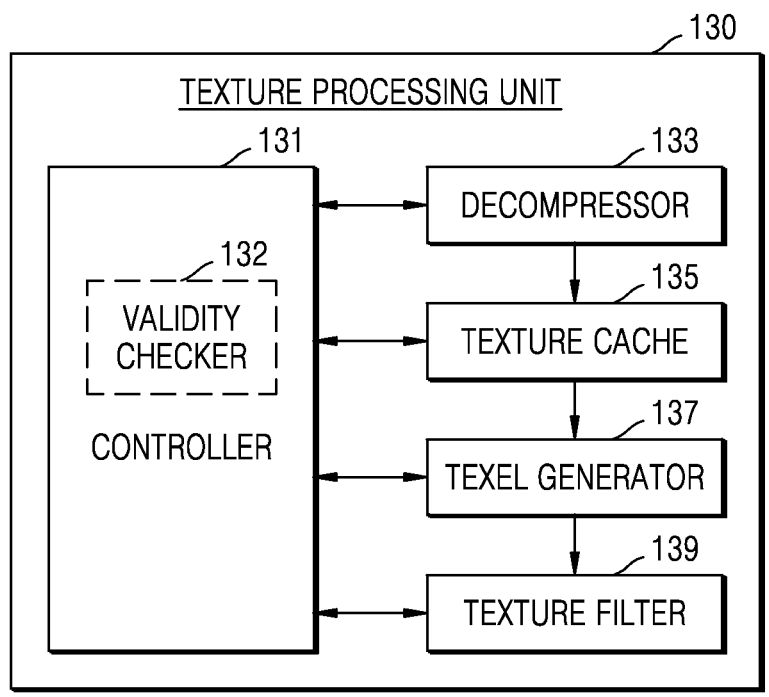
FIG. 9 is a block diagram illustrating another example of a configuration of a texture processing unit.

FIG. 9 is a block diagram illustrating another example of a configuration of the texture processing unit 130.

Referring to FIG. 9, the texture processing unit 130 includes the controller 131, the decompressor 133, the texture cache 135, the texel generator 137, and the texture filter 139. In this example, the controller 131 of the texture processing unit 130 of FIG. 9 further includes a validity checker 132.

The validity checker 132 determines whether a texel requested from the texture processing unit 130 is actually used for pixel shading. In other words, the validity checker 132 first determines whether the texel requested from the texture processing unit 130 is actually used for pixel shading before the texel requested from the texture processing unit 130 is generated. Accordingly, an unnecessary decompression process may be avoided if the texel requested from the texture processing unit 130 is not actually used for pixel shading.

For example, when there is a zombie pixel in pixels to be processed by the shader core 120, when only some components among RGBA (red, green, blue, and alpha (transparency)) are requested from the texture processing unit 130, or when some component values are not used due to a swizzle operation, some unnecessary decompression processes may be avoided. A zombie pixel is a dummy pixel that is needed to extract information, but does not need to be processed by the texture processing unit 130. For example, in graphics processing, generally a set of adjacent pixels, such as a 2×2 or a 4×4 set of pixels, is processed together to extract information from the relationships among the pixels. However, in some cases, one or more of the pixels of the set of pixels are merely needed to extract the information, and do not need to be processed by the texture processing unit 130, thereby avoiding unnecessary decompression processes.

When it is determined that the texel requested from the texture processing unit 130 is actually used for pixel shading, the controller 131 including the validity checker 132 reads a representative value and a weight from the texture cache 135 according to an index corresponding to the requested texel. In contrast, when it is determined that the texel requested from the texture processing unit 130 is not actually used for pixel shading, the controller 131 including the validity checker 132 returns a predetermined value in response to the request and does not perform a decompression process for the requested texel, thereby more effectively reducing power consumption.

Figure 10:
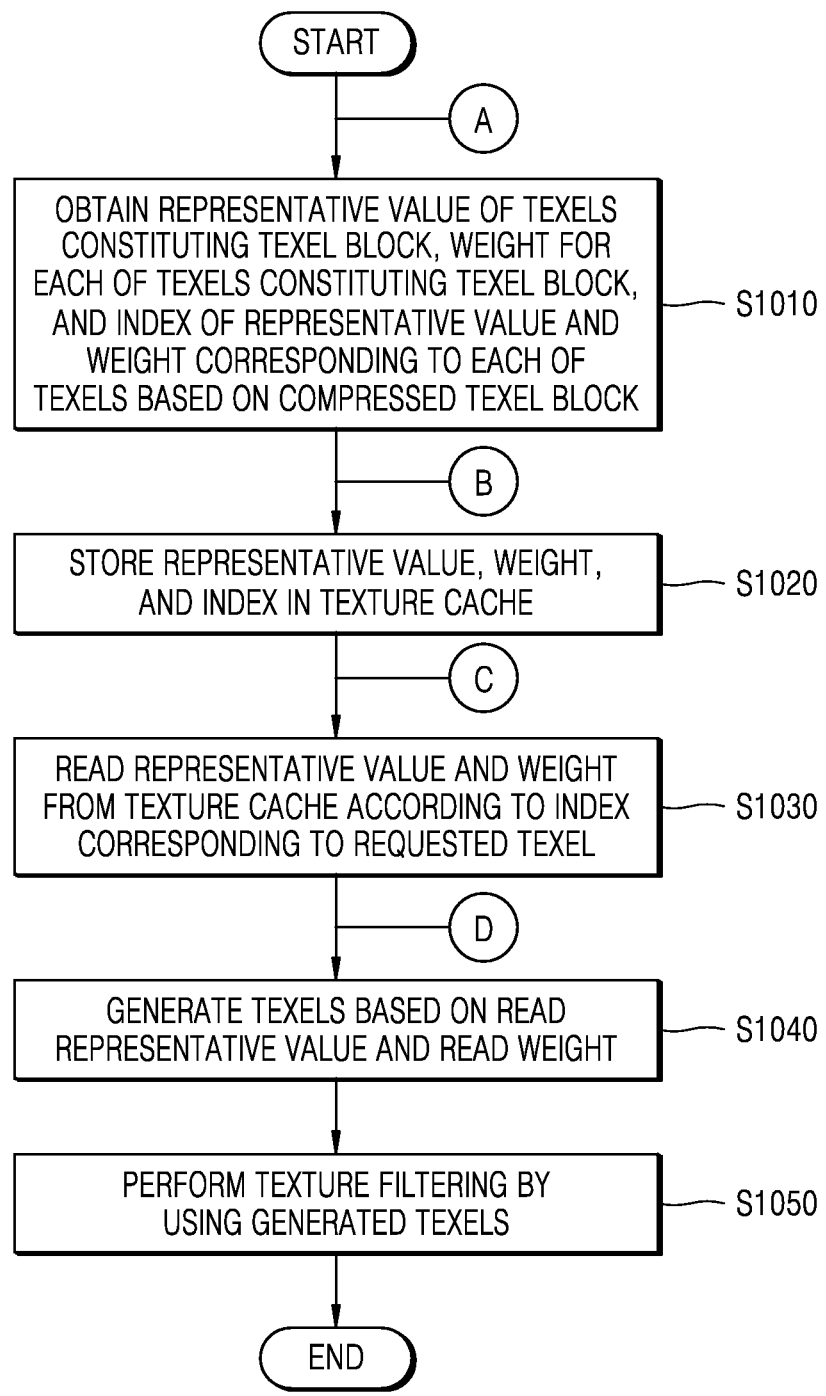
FIG. 10 is a flowchart of an example of a texture processing method.

FIG. 10 is a flowchart of an example of a texture processing method. The above description of the texture processing unit 130 is also applicable to the texture processing method, and thus will not be repeated here for conciseness.

In operation S1010, the texture processing unit 130 obtains, based on a compressed texel block, a representative value of texels constituting a texel block, a weight for each of the texels constituting the texel block, and an index of the representative value and the weight corresponding to each of the texels constituting the texel block. This operation corresponds to part of a decompression process, and is a preparation operation for completing subsequent decompression only for a requested texel.

Figure 11:
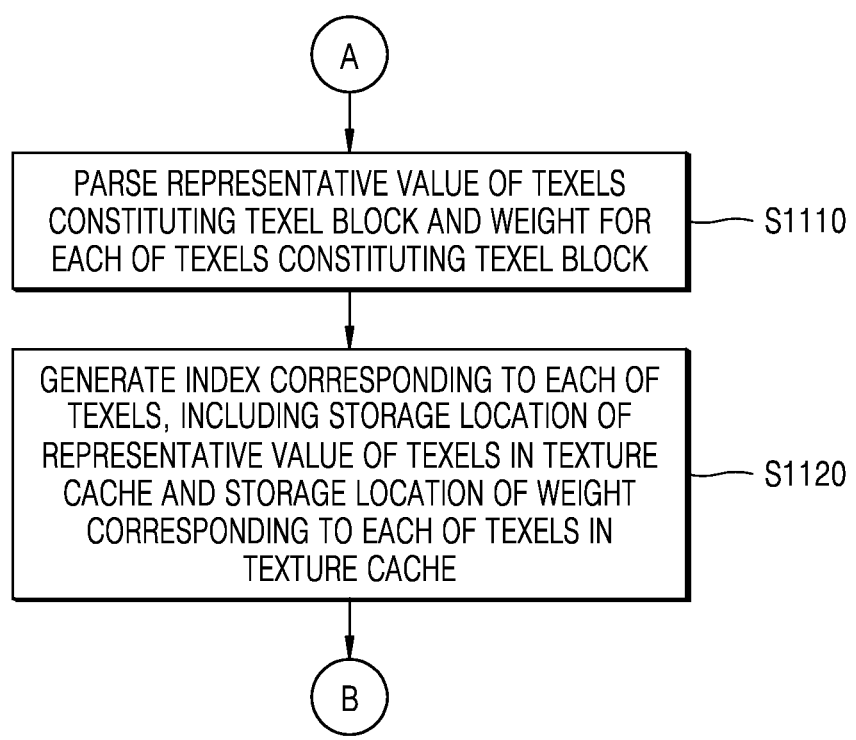
FIG. 11 is a detailed flowchart of an example of an operation of obtaining a representative value, a weight, and an index in the texture processing method.

FIG. 11 is a detailed flowchart of an example of an operation of obtaining a representative value, a weight, and an index in the texture processing method.

In operation S1110, the texture processing unit 130 parses the representative value of the texels constituting the texel block and the weight for each of the texels constituting the texel block based on the compressed texel block. The texture processing unit 130 obtains the representative value and the weight by identifying an area in which the representative value is stored and an area in which the weight is stored in the compressed texel block.

In operation S1120, the texture processing unit 130 generates the index corresponding to each of the texels, including a storage location of the representative value of the texels in the texture cache 135 and a storage location of the weight corresponding to each of the texels in the texture cache 135. In other words, the texture processing unit 130 generates the index corresponding to each of the texels, including a storage location of the representative value of the texels in the representative value cache 135-2 and a storage location of the weight corresponding to each of the texels in the weight cache 135-3.

Referring back to FIG. 10, in operation S1020, the texture processing unit 130 stores the representative value, the weight, and the index in the texture cache 135. In other words, the texture processing unit 130 stores the representative value of the texels corresponding to the entire compressed texel block, the weight for each of the texels constituting the texel block, and the index of the representative value and the weight corresponding to each of the texels constituting the texel block, which will now be explained in further detail with reference to FIG. 12.

Figure 12:
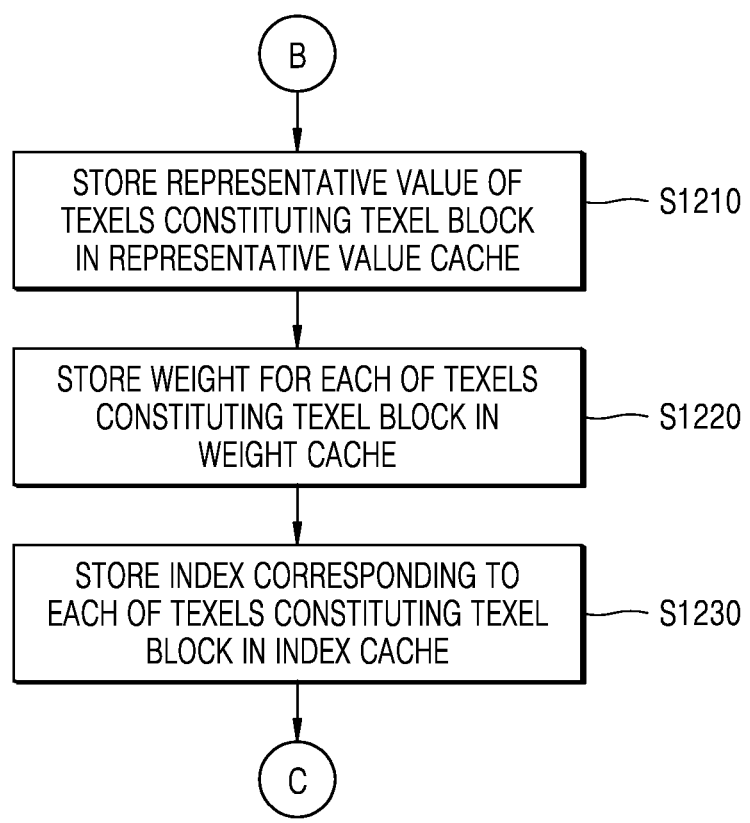
FIG. 12 is a detailed flowchart of an example of an operation of storing the representative value, the weight, and the index in the texture processing method.

FIG. 12 is a detailed flowchart of an example of an operation of storing the representative value, the weight, and the index in the texture processing method.

In operation S1210, the texture processing unit 130 stores the representative value of the texels constituting the texel block in the representative value cache 135-2. The representative value of the texels parsed by the representative value parser 133-2 of the texture processing unit 130 are stored in the representative value cache 135-2.

In operation S1220, the texture processing unit 130 stores the weight for each of the texels constituting the texel block in the weight cache 135-3. The weight corresponding to each of the texels parsed by the weight parser 133-3 of the texture processing unit 130 is stored in the weight cache 135-3.

Operations 1210 and 1220 may be performed in reverse order or simultaneously performed.

In operation S1230, the texture processing unit 130 stores the index corresponding to each of the texels constituting the texel block in the index cache 135-1. The index corresponding to each of the texels constituting the texel block generated by the index generator 133-1 of the texture processing unit 130 is stored in the index cache 135-1. The index cache 135-1 of the texture processing unit 130 matches the index corresponding to each of the texels to a texel address and then stores the matched index.

Referring back to FIG. 10, in operation S1030, the texture processing unit 130 reads the representative value and the weight from the texture cache 135 according to an index corresponding to a texel requested from the texture processing unit 130, which will now be explained in further detail with reference to FIGS. 13 through 15.

Figure 13:
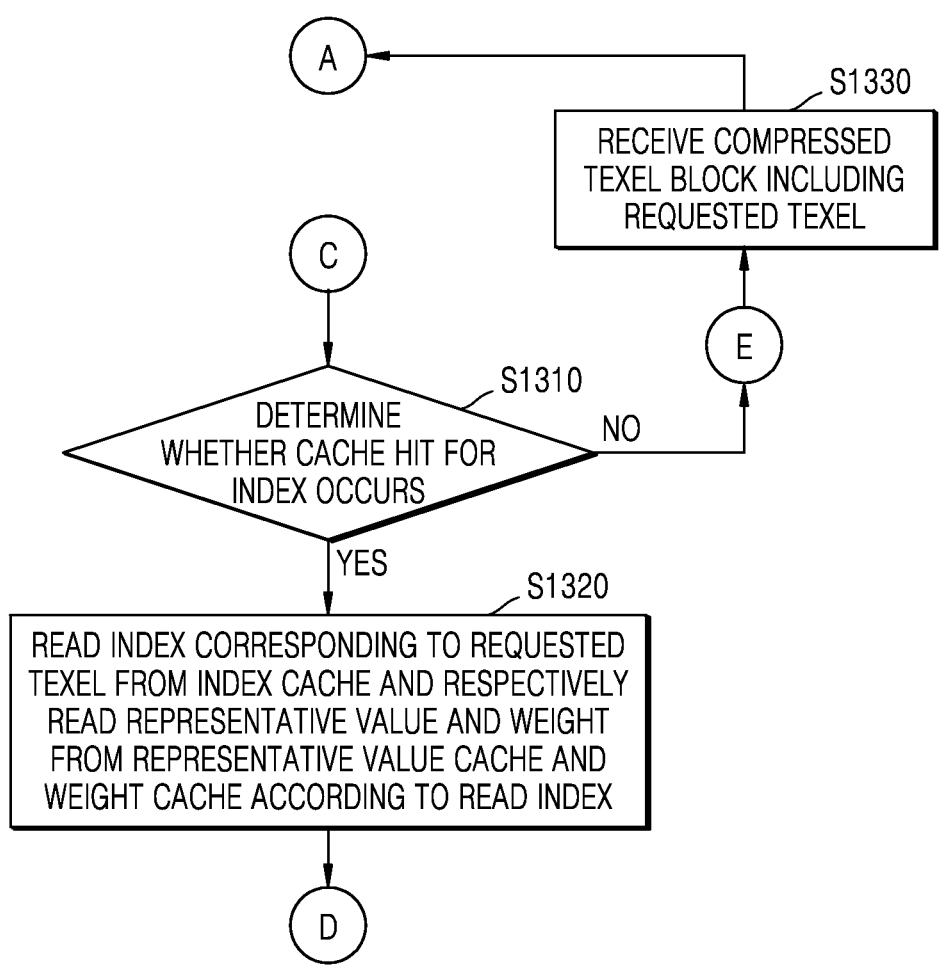
FIG. 13 is a detailed flowchart of an example of an operation of reading the representative value and the weight from a texture cache according to the index corresponding to a texel requested from the texture processing unit in the texture processing method.

FIG. 13 is a detailed flowchart of an example of an operation of reading the representative value and the weight from the texture cache 135 according to the index corresponding to the texel requested from the texture processing unit 130 in the texture processing method.

In operation S1310, the texture processing unit 130 determines whether the index of the texel requested from the texture processing unit 130 is stored in the index cache 135-1. In other words, the texture processing unit 130 determines whether a cache hit for the index of the texel requested from the texture processing unit 130 occurs in the index cache 135-1. In detail, the texture processing unit 130 determines whether an index matched to the texel address of the requested texel is stored in the index cache 135-1 by transmitting the texel address of the texel requested from the texture processing unit 130 to the index cache 135-1.

When it is determined in operation S1310 that the index corresponding to the texel requested from the texture processing unit 130 can be read from the index cache 135-1, that is, when a cache hit occurs, operation S1320 is performed. In operation S1320, the texture processing unit 130 respectively reads representative value and a weight corresponding to the texel requested from the texture processing unit 130 from the representative value cache 135-2 and the weight cache 135-3 according to the index read from the index cache 135-1.

When it is determined in operation S1310 that the index corresponding to the texel requested from the texture processing unit 130 cannot be read from the index cache 135-1, that is, when a cache miss occurs, operation S1330 is performed. In operation S1330, the decompressor 133 of the texture processing unit 130 receives a compressed texel block including the requested texel, which will now be explained in further detail with reference to FIG. 14.

Figure 14:
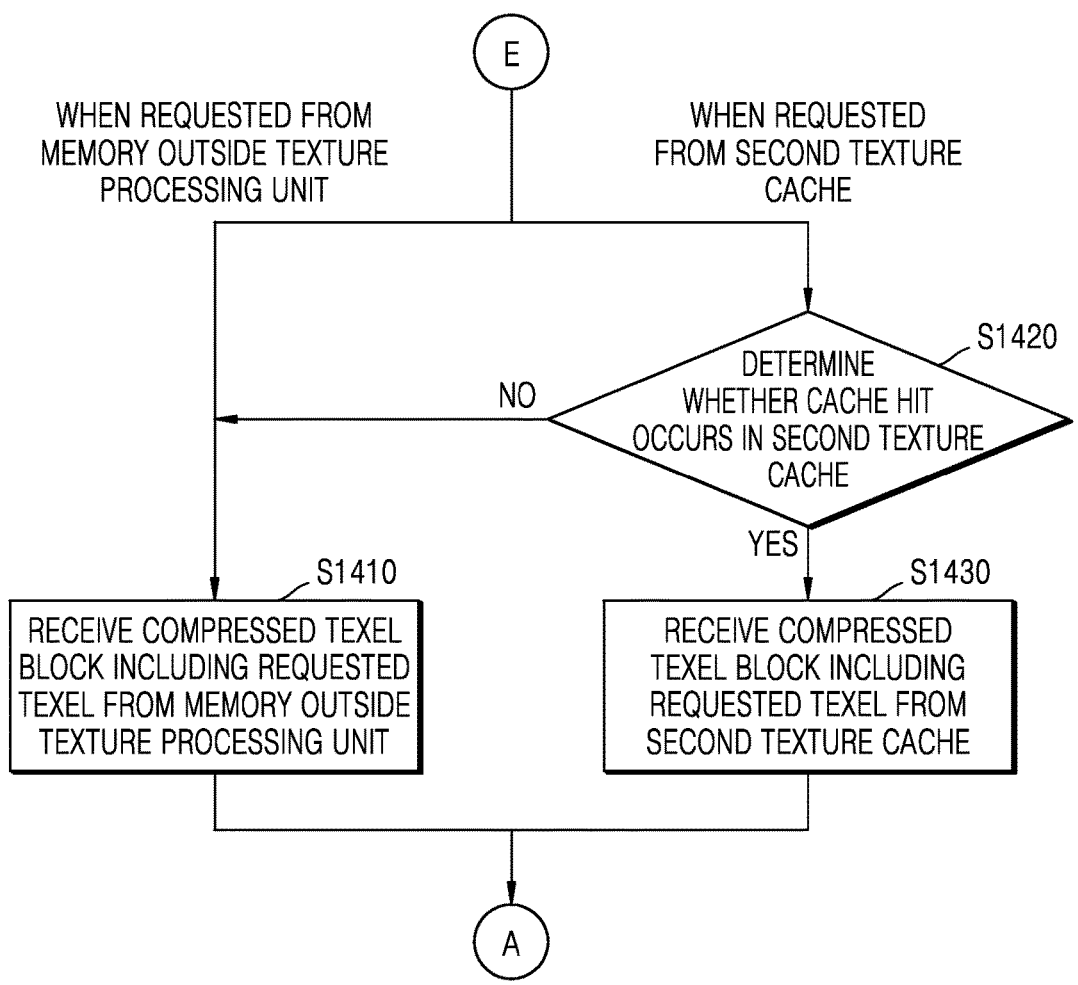
FIG. 14 is a detailed flowchart of an example of an operation of receiving a compressed texel block including the texel requested from the texture processing unit in the texture processing method.

FIG. 14 is a detailed flowchart of an example of an operation of receiving the compressed texel block including the texel requested from the texture processing unit 130 in the texture processing method.

In operation S1410, when the compressed texel block including the texel requested from the texture processing unit 130 is requested from the memory 200 outside the texture processing unit 130, the texture processing unit 130 receives the compressed texel block including the requested texel from the memory 200 outside the texture processing unit 130. When a compressed texture is stored in the memory 200 outside the texture processing unit 130 due to a lack of space inside the texture processing unit 130, operation S1410 is performed.

In operation S1420, when the compressed texel block including the texel requested from the texture processing unit 130 is requested from the second texture cache 136 inside the texture processing unit 130, the texture processing unit 130 determines whether the compressed texel block including the requested texel is stored in the second texture cache 136. When it is determined in operation S1420 that a cache miss occurs in the second texture cache 136, the operation proceeds to operation S1410 in which the compressed texel block including the requested texel is received from the memory 200 outside the texture processing unit 130. In contrast, when it is determined in operation S1420 that a cache hit occurs in the second texture cache 136, the operation proceeds to operation S1430.

In operation S1430, the texture processing unit 130 receives the compressed texel block including the texel requested from the texture processing unit 130 from the second texture cache 136 inside the texture processing unit 130. When the texture processing unit 130 includes the second texture cache 136 that receives and stores the compressed texel block from the memory 200 outside the texture processing unit 130 to reduce the number of accesses to the memory 200 outside the texture processing unit 130, operation S1430 is performed.

Figure 15:
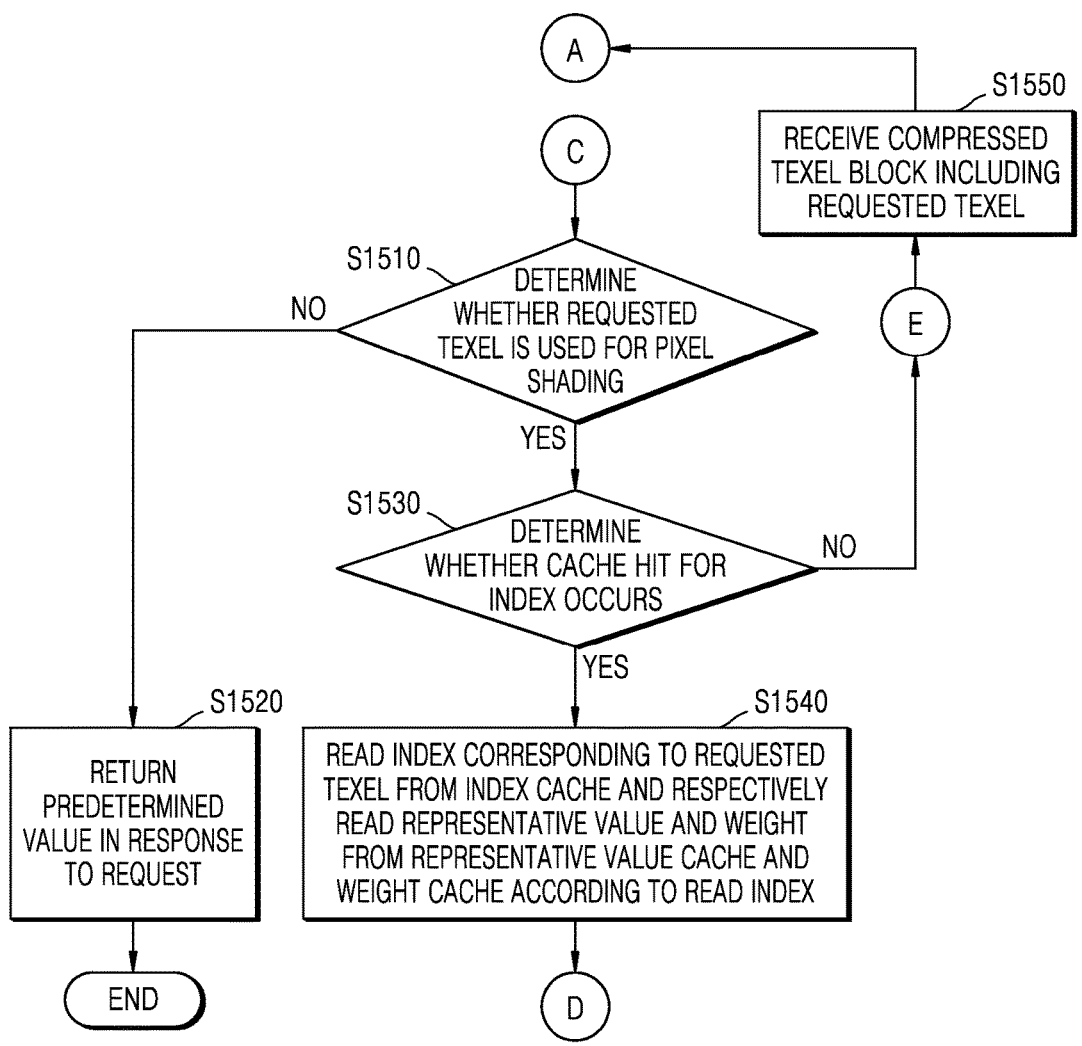
FIG. 15 is a detailed flowchart of another example of an operation of reading the representative value and the weight from the texture cache according to the index corresponding to the texel requested from the texture processing unit in the texture processing method.

FIG. 15 is a detailed flowchart of another example of an operation of reading the representative value and the weight from the texture cache 135 according to the index corresponding to the texel requested from the texture processing unit 130 in the texture processing method.

In operation S1510, the texture processing unit 130 determines whether the texel requested from the texture processing unit 130 is used for pixel shading. When it is determined in operation S1510 that the texel requested from the texture processing unit 130 is used for pixel shading, operation S1530 is performed. In contrast, when it is determined in operation S1510 that the texel requested from the texture processing unit 130 is not used for pixel shading, operation S1520 is performed.

In operation S1520, the texture processing unit 130 returns a predetermined value in response to the texel request. Accordingly, a decompression process for the requested texel is not performed, thereby further effectively reducing power consumption.

In operation S1530, the texture processing unit 130 determines whether the index of the texel requested from the texture processing unit 130 is stored in the index cache 135-1. In other words, the texture processing unit 130 determines whether a cache hit for the index of the texel requested from the texture processing unit 130 occurs in the index cache 135-1. In detail, the texture processing unit 130 determines whether an index matched to the texel address of the requested texel is stored in the index cache 135-1 by transmitting the texel address of the texel requested from the texture processing unit 130 to the index cache 135-1.

When it is determined in operation S1530 that the index corresponding to the texel requested from the texture processing unit 130 can be read from the index cache 135-1, that is, when a cache hit occurs, operation S1540 is performed. In operation S1540, the texture processing unit 130 respectively reads read the representative value and the weight corresponding to the texel requested from the texture processing unit 130 according to the index read from the index cache 135-1 from the representative value cache 135-2 and the weight cache 135-3.

When it is determined in operation S1530 that the index corresponding to the texel requested from the texture processing unit 130 cannot be read from the index cache 135-1, that is, when a cache miss occurs, operation S1550 is performed. In operation S1550, the decompressor 133 of the texture processing unit 130 receives the compressed texel block including the requested texel as described with reference to FIG. 14.

Referring back to FIG. 10, in operation S1040, the texture processing unit 130 generates texels based on the read representative value and the read weight. The texture processing unit 130 generates only some texels of the compressed texel block by performing interpolation using the representative value and the weight read from the texture cache 135. In other words, the texture processing unit 130 completes a decompression process only for those texels requested from the texture processing unit 130, instead of the entire compressed texel block.

In operation S1050, the texture processing unit 130 performs texture filtering using the generated texels.

The GPU 100, the rasterizer 110, the pixel processing unit 140, and the tile buffer 150 in FIG. 1, the shader core 120 and the memory 200 in FIGS. 1 and 3, the texture processing unit 130 in FIGS. 1, 3, 6, 8, and 9, the controller 131, the decompressor 133, the texture cache 135, the texel generator 137, and the texture filter 139 in FIGS. 3, 6, 8, and 9, the index generator 133-1, the representative value parser 133-2, the weight parser 133-3, the index cache 135-1, the representative value cache 135-2, and the weight cache 135-3 in FIG. 6, the second texture cache 136 in FIG. 8, and the validity checker 132 in FIG. 9 that perform the operations described herein with respect to FIGS. 1-15 are implemented by hardware components. Examples of hardware components include controllers, generators, drivers, memories, comparators, arithmetic logic units, adders, multipliers, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-15. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 10-15 that perform the operations described herein with respect to FIGS. 1-15 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A texture processing method of processing a compressed texel block in which a plurality of texels included in a texture are compressed into a desired block unit, the texture processing method comprising:
    obtaining, based on the compressed texel block,
        two representative values from the plurality of texels included in a texel block, each of the representative values corresponding to a color value associated with either a first texel or a last texel of the texel block, the texels being arranged in a desired order,
        a weight for each of the texels included in the texel block, and
        an index of the representative values and the weight corresponding to each of the texels included in the texel block;
    storing the representative values, the weights, and the index in a texture cache;
    reading the representative values and the weights from the texture cache according to an index corresponding to a requested texel;
    generating texels based on the read representative values and the read weights; and
    performing texture filtering using the generated texels.

2. The texture processing method of claim 1, wherein the obtaining comprises:
    parsing the representative values of the texels included in the texel block and the weight for each of the texels included in the texel block; and
    generating the index corresponding to each of the texels so that the index corresponding to each of the texels comprises a storage location indicating where the representative values are stored in the texture cache, and a storage location indicating where a respective one of the weights is stored in the texture cache.

3. The texture processing method of claim 1, wherein the storing comprises:
    storing the representative values of the texels included in the texel block in a representative value cache;
    storing the weight for each of the texels included in the texel block in a weight cache; and
    storing the index corresponding to each of the texels included in the texel block in an index cache.

4. The texture processing method of claim 3, wherein the reading comprises:
    reading the index corresponding to the requested texel from the index cache; and
    respectively reading the representative values and the weight from the representative value cache and the weight cache according to the read index.

5. The texture processing method of claim 1, further comprising:
    receiving a compressed texel block from a memory outside a texture processing unit; wherein
    the compressed texel block includes at least the requested texel, and
    the texture processing unit is configured to perform the texture processing method in response to the index corresponding to the requested texel not being stored in the texture cache.

6. The texture processing method of claim 1, further comprising:
receiving a compressed texel block comprising the requested texel from a second texture cache, the second texture cache configured to receive and store the compressed texel block from a memory outside a texture processing unit; wherein
the compressed texel block includes at least the requested texel, and
the texture processing unit is configured to perform the texture processing method in response to the index corresponding to the requested texel not being stored in the texture cache.

7. The texture processing method of claim 1, wherein the generating of the texels comprises generating only some texels of the compressed texel block by performing interpolation using the read representative values and the read weight.

8. The texture processing method of claim 1, wherein the reading comprises:
determining whether the requested texel is used for pixel shading; and
reading the representative values and the weight from the texture cache according to the index corresponding to the requested texel in response to a result of the determining being that the requested pixel is used for pixel shading.

9. The texture processing method of claim 8, further comprising:
returning a desired value in response to the request in response to a result of the determining being that the requested pixel is not used for pixel shading.

10. A non-transitory computer-readable storage medium storing computer readable instructions for causing at least one processor to perform the texture processing method of claim 1.

11. A texture processing unit for processing a compressed texel block in which texels included in a texture are compressed into a desired block unit, the texture processing unit comprising:
at least one processor configured to,
obtain, based on the compressed texel block,
two representative values from values of the texels included in a texel block, each of the representative values corresponding to a color value associated with either a first texel or a last texel of the texel block, the texels being arranged in a desired order,
a weight for each of the texels included in the texel block, and
an index of the representative values and the weight corresponding to each of the texels included in the texel block;
store the representative values, the weights, and the index in a texture cache;
read the representative values and the weights from the texture cache according to an index corresponding to a requested texel;
generate texels based on the read representative values and the read weights; and
perform texture filtering using the generated texels.

12. The texture processing unit of claim 11, wherein the at least one processor is further configured to:
parse the representative values of the texels included in the texel block;
parse the weight for each of the texels included in the texel block; and
generate the index corresponding to each of the texels so that the index corresponding to each of the texels comprises a storage location indicating where the representative values are stored in the texture cache, and a storage location indicating where a respective one of the weights is stored in the texture cache.

13. The texture processing unit of claim 11, wherein the at least one processor is further configured to:
store the representative values of the texels included in the texel block in a representative value cache;
store the weight for each of the texels included in the texel block in a weight cache; and
store the index corresponding to each of the texels included in the texel block in an index cache.

14. The texture processing unit of claim 13, wherein the at least one processor is further configured to:
read the index corresponding to the requested texel from the index cache; and
respectively read the representative values and the weight from the representative value cache and the weight cache according to the read index.

15. The texture processing unit of claim 11, wherein the at least one processor is further configured to:
receive a compressed texel block from a memory outside the texture processing unit in response to the index corresponding to the requested texel not being stored in the texture cache, the compressed texel block including the requested texel.

16. The texture processing unit of claim 11, where in the at least one processor is further configured to:
receive and store in a second texture cache the compressed texel block from a memory outside the texture processing unit, the compressed texel block including the requested texel; and
receive a compressed texel block from the second texture cache in response to the index corresponding to the requested texel not being stored in the texture cache, the compressed texel block including the requested texel.

17. The texture processing unit of claim 11, wherein the at least one processor is further configured to:
generate only some texels of the compressed texel block by performing interpolation using the read representative values and the read weight.

18. The texture processing unit of claim 11, wherein the at least one processor is further configured to:
determine whether the requested texel is used for pixel shading; and
read the representative values and the weight from the texture cache according to the index corresponding to the requested texel in response to a result of the determining being that the requested texel is used for pixel shading.

19. The texture processing unit of claim 18, wherein the at least one processor is further configured to:
return a desired value in response to the request in response to a result of the determining being that the requested texel is not used for pixel shading.

20. A texture processing unit for processing a compressed texel block in which texels included in a texture are compressed into a desired block unit, the texture processing unit comprising:
at least one processor configured to,
obtain, based on the compressed texel block,
two representative values from values of the texels included in a texel block, each of the representative values corresponding to a color value associated with either a first texel or a last texel of the texel block,
a weight for each of the texels included in the texel block, and
an index of the representative values and the weight corresponding to each of the texels included in the texel block;
receive a compressed texel block from a memory outside the texture processing unit in response to the index corresponding to a requested texel not being stored in a texture cache, the compressed texel block including the requested texel;
store the representative values, the weights, and the index in the texture cache;
read the representative values and the weights from the texture cache according to an index corresponding to a requested texel;
generate texels based on the read representative values and the read weights; and
perform texture filtering using the generated texels.

* * * * *